United States Patent
Kurmis (10) Patent No.: US 6,991,102 B2
(45) Date of Patent: Jan. 31, 2006

(54) MAGAZINE STRIP FOR RATCHETS

(75) Inventor: Viktor Kurmis, Pinneberg (DE)

(73) Assignee: Hellermann Tyton GmbH, Tornesch (DE)

( * ) Notice: Subject to any disclaimer, the term of this patent is extended or adjusted under 35 U.S.C. 154(b) by 60 days.

(21) Appl. No.: 10/467,472

(22) PCT Filed: Feb. 6, 2002

(86) PCT No.: PCT/EP02/01240

§ 371 (c)(1),
(2), (4) Date: Aug. 8, 2003

(87) PCT Pub. No.: WO02/064443

PCT Pub. Date: Aug. 22, 2002

(65) Prior Publication Data

US 2004/0074806 A1   Apr. 22, 2004

(30) Foreign Application Priority Data

Feb. 12, 2001 (EP) ................... 01103247

(51) Int. Cl.
B65D 85/24 (2006.01)
B21F 9/02 (2006.01)
B65B 13/34 (2006.01)

(52) U.S. Cl. ............. 206/343; 24/16 PB; 100/30; 100/33 PB; 140/93.2; 140/93 A; 140/123.6; 206/820

(58) Field of Classification Search ........ 206/343, 206/390, 820; 24/16 PB; 140/93 A, 93.2, 140/123.5, 123.6; 100/30, 33 PB
See application file for complete search history.

(56) References Cited

U.S. PATENT DOCUMENTS

| | | | | | |
|---|---|---|---|---|---|
| 1,732,581 | A | * | 10/1929 | Johnson | ............. 403/275 |
| 2,823,789 | A | * | 2/1958 | Rudolph | ............. 206/820 |
| 3,353,227 | A | * | 11/1967 | Heinrich | ............. 24/16 PB |
| 4,610,067 | A | | 9/1986 | Hara | |
| 4,680,834 | A | | 7/1987 | Andre et al. | |
| 4,908,911 | A | * | 3/1990 | Bretti et al. | ............. 24/16 PB |
| 5,351,611 | A | * | 10/1994 | Schafer et al. | ............. 100/30 |
| 5,471,920 | A | * | 12/1995 | Schafer et al. | ............. 100/30 |
| 6,070,304 | A | * | 6/2000 | Lii | ............. 24/16 PB |

FOREIGN PATENT DOCUMENTS

EP   0 297 337 A   1/1989

* cited by examiner

Primary Examiner—Bryon P. Gehman
(74) Attorney, Agent, or Firm—Alix, Yale & Ristas, LLP (57) ABSTRACT

A magazine strip of tie ratchets which are provided for holding the ends of ties for binding elongated articles such as cable harnesses and are connected to one another by webs, the width of which is not greater than half the ratchet width and which are arranged adjacent to the tie entry side of the ratchets. The webs have a length of not more than 1.3 mm and/or one sixth of the ratchet dimension in the direction of the magazine strip. The width of the essentially parallel wall sections which carry the webs is expediently not greater than three quarters of the entire width of the ratchets. The thickness/width ratio of the webs should be not greater than 1/5. The invention also relates to a tool for binding cable harnesses which ensures that the webs are cut exactly in the center.

17 Claims, 6 Drawing Sheets

MAGAZINE STRIP FOR RATCHETS

BACKGROUND OF THE INVENTION

For the mechanical binding of articles, in particular cable harnesses, by means of tie loops, the ends of which are held by tie ratchets, the tie ratchets are fed to the binding tool in the form of a magazine strip in which the tie ratchets are connected to one another by flexible webs which in each case are cut in the tool before use. If the webs are severed only by one cut, projecting stubs remain behind. It is certainly also known to avoid these stubs by the webs being removed essentially completely by two cuts executed at their ends. However, this results in scrap, which in many applications (for example in aircraft or satellite construction) must not be left in-situ in an uncontrolled manner and is therefore undesirable. The invention therefore assumes that a stub piece remains on the ratchet when the web is severed. This stub piece may be sharp-edged and may lead to a risk of injury, in particular if the separating cut is not executed in the center (EP-B-297 337, FIG. 3) or if it is arranged on a laterally projecting flange (U.S. Pat. No. 4,610,067, FIG. 1). But even when the web is cut symmetrically and projects directly from those walls of the ratchets which are parallel to one another, it is relatively long in relation to the dimensions of the ratchet (U.S. Pat. No. 4,680,834, FIGS. 6 to 8).

SUMMARY OF THE INVENTION

The object of the invention is therefore to reduce the problem of the risk of injury on account of the web stub projecting from tie ratchets. The solution according to the invention consists in the provision of a magazine strip of tie ratchets as claimed in claim 1 which are provided for holding the ends of ties and binding elongated articles such as cable harnesses and are connected to one another by webs. These webs have a length of not more than 1 mm and/or one eighth of the ratchet dimension in the direction of the magazine strip. By the correlation between the known feature that the width of the web is not greater than half the width of the ratchet and the novel feature that its length is not greater than 1 mm (the length of the web stub is therefore not greater than about ½ mm), the risk of injury is considerably reduced.

Since the length of the web between adjacent ratchets is small, the distance between those surfaces of these ratchets which face one another is also small. This may cause problems at the injection molds in which these ratchets are produced. These molds contain a group of mold cavities for one ratchet in each case. The distance between the ratchets is formed by mold walls which separate the mold cavities. For reasons of stability and heat dissipation, these walls cannot be made as thin as desired. This is one of the reasons why in previously known magazine strips the distance between adjacent ratchets and therefore the web length are greater than is desirable according to the present invention.

The invention has recognized that the distance between the ratchet surfaces and therefore the web length can be reduced by the width of those surface sections of the adjacent ratchets which are approximately parallel to one another being made substantially smaller than the width of the ratchets. This is achieved by those sides of the ratchets which face one another being substantially parallel to one another only in a center, limited region, whereas to the side of said region they are defined by inclined surfaces which diverge and form a space widening in a wedge shape. For the production molds, this means that the mold walls between adjacent mold cavities are firstly formed by a pair of wedge-shaped, thick and stable structures which hold a narrow wall piece between them, which may be relatively thin on account of its small width.

The width of the essentially parallel surface sections is expediently not greater than three quarters, or else preferably not greater than two thirds, of the entire width of the ratchets.

It is certainly conceivable for the webs to be arranged not directly on the walls forming the ratchet body but on a bead which projects from each ratchet in the direction of the adjacent ratchet and which is thickened relative to the web. Even then, however, the distance between those essentially parallel surface sections of the ratchets which face one another, in their region which carries the web or the bead, is expediently not greater than 1 mm. The bead may be formed by the root regions of the webs being thickened in relation to the center region of the webs. Regarded as the root region of a web is that region of the web which is adjacent to the wall surface carrying the web.

The webs are arranged adjacent to the tie entry side of the ratchets. The tie entry side refers to that side of a ratchet from which the ends of the tie loop enclosing the article to be bound enter the ratchet. This side is predetermined by the arrangement of the locking members in the ratchet.

In known magazine strips (U.S. Pat. Nos. 4,610,067, 4,680,834), the web is designed to be extremely narrow. The reason for this is obviously due to the fact that the web cross section is to be kept small in order to reduce the cutting force which has to be applied in order to sever it. However, the narrowness of the web has the disadvantage that the magazine strip is unstable. There is in particular the risk of the ratchets being twisted relative to one another about the longitudinal direction of the strip. This may result in problems when guiding the magazine strip into a handling tool. The invention achieves greater stability of the magazine strip owing to the fact that the width of the webs is equal to at least one quarter of the ratchet width. Nonetheless, it succeeds in keeping the cutting forces small, namely by the ratio of thickness to width of the webs being kept small, namely not greater than 1/5. This ratio, in combination with the large web width, results in an extremely small thickness. The web therefore assumes the form of a thin film which can be easily cut but offers a high resistance to lateral bending (about an axis extended transversely to the web plane) and torsion of the magazine strip.

The connecting web is expediently connected to the adjacent ratchets in one piece by common hot plastic forming. If this is not possible, the web should be connected in one piece to one of the two ratchets and in a positive-locking manner to the other one, the positive locking expediently being achieved by the web having end thickening which is enclosed by the material of a ratchet from the hot plastic state.

The desired shortness of the web stubs, at a minimum length of the webs which is predetermined in practice, depends on whether the webs are cut in the center. This requires accurate positioning of the web to be cut in the handling tool. Positioning of the ratchets in the handling tool takes place in the case of known tools only at the ratchet holder, which receives the foremost ratchet of the ratchet chain for handling. Therefore, in known tools for handling ratchet chains, provision is made for the cut to be carried out close to the ratchet holder. However, this is disadvantageous, because many components are crowded there anyway. The intention of the invention is therefore to provide the device for separating the ratchets at a greater distance from the ratchet holder. However, on account of the distance tolerances of the ratchets, no accurate positioning of the ratchets can be expected there if only that ratchet which is located in the ratchet holder is accurately positioned, and no cut exactly in the center of a web dimensioned to be very short can be expected. The invention solves this problem by the separating device being arranged on a support part which is movable in the feed direction of the ratchets and which also carries a positioning device for the magazine strip. This positioning device may be formed by the driver which is to be provided anyway for the feed of the magazine chain.

When the width of a component is referred to in the present connection, this always means the dimension transversely to the longitudinal direction of the magazine strip and transversely to the direction of the tie passage opening provided in the ratchet. The term "length" refers to a dimension in the longitudinal direction of the magazine strip. The term "thickness" refers to the dimension perpendicular to the surface extent of the relevant part.

BRIEF DESCRIPTION OF THE DRAWINGS

The invention is explained below in more detail with reference to the drawing, which illustrates an advantageous exemplary embodiment and in which.

DETAILED DESCRIPTION OF THE PREFERRED EMBODIMENTS

Figure 1:
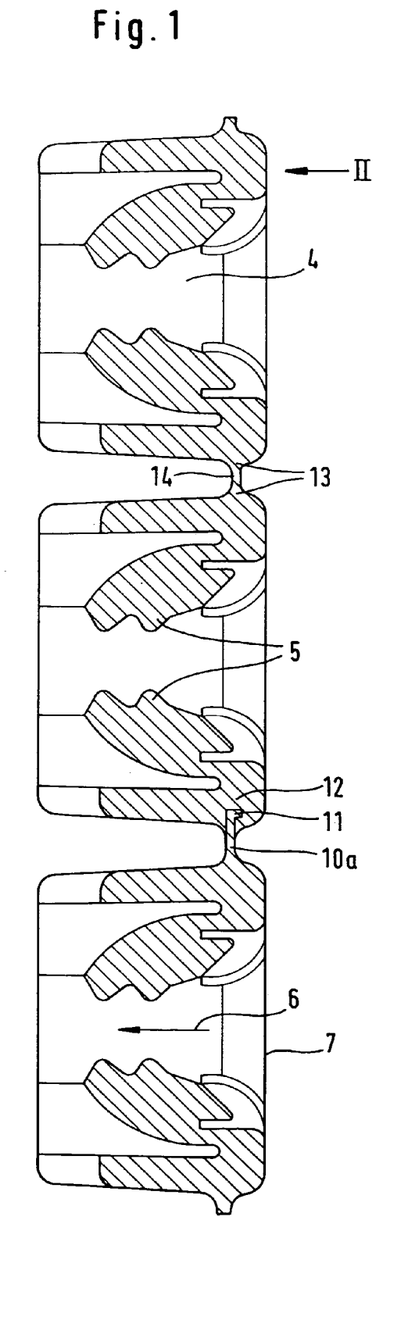
FIG. 1 shows a longitudinal section through three ratchets of a magazine tie.
Figure 2:
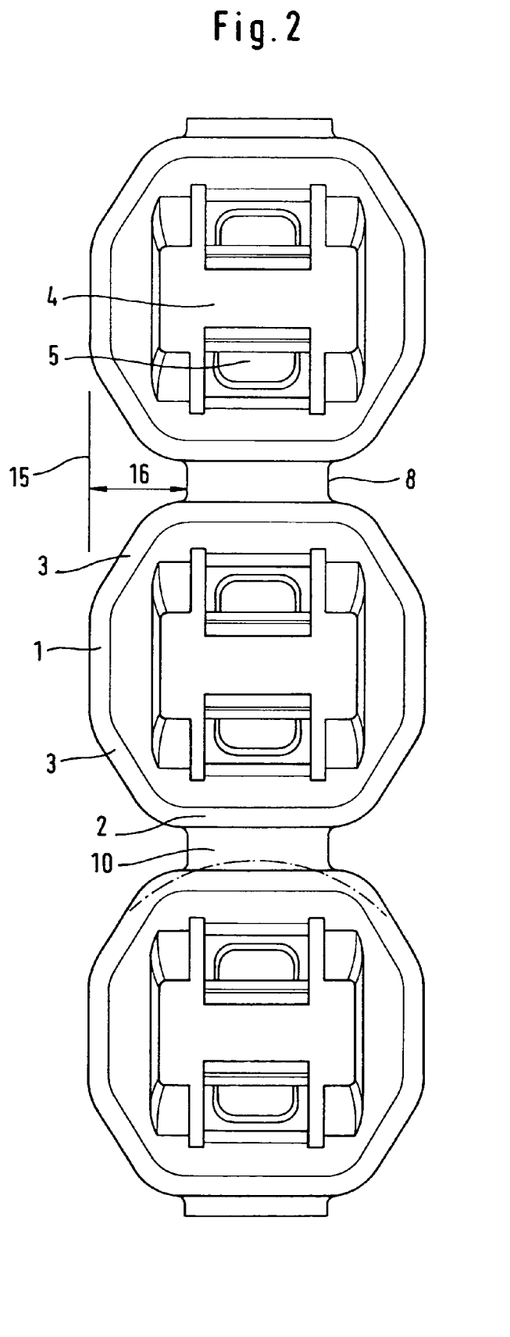
FIG. 2 shows a plan view corresponding to FIG. 1 in arrow direction "II"

Each of the ratchets, which are shown greatly enlarged in the representation, comprises an encircling wall which is composed of wall sections 1 parallel to the direction of the magazine strip, wall sections 2 running perpendicularly to this direction, and obliquely running transition sections 3. It contains a through-opening 4 for the ties to be bound and locking pawls 5 which interact with a tooth system of these ties. The locking pawls 5 are arranged in such a way that they allow the toothed ties to enter the ratchet in arrow direction "6", but lock in the opposite direction. The side 7 of the ratchets is therefore referred to as tie entry side.

Adjacent ties of the magazine strip are connected to one another by webs 10. The latter are mostly made in one piece with both adjacent ratchets. However, depending on the type of production, they may also be connected in a positive-locking manner to at least one of the two ratchets. This is shown at the web 10a, the thickened, undercut head 11 of which is enclosed by the wall material 12 of the associated ratchet. The enclosure is achieved by the end of the web 10a having been inserted into the mold of the ratchet before the hot plastic forming of the latter and by the material 12 therefore having flowed around this end before it had solidified.

Figure 9:
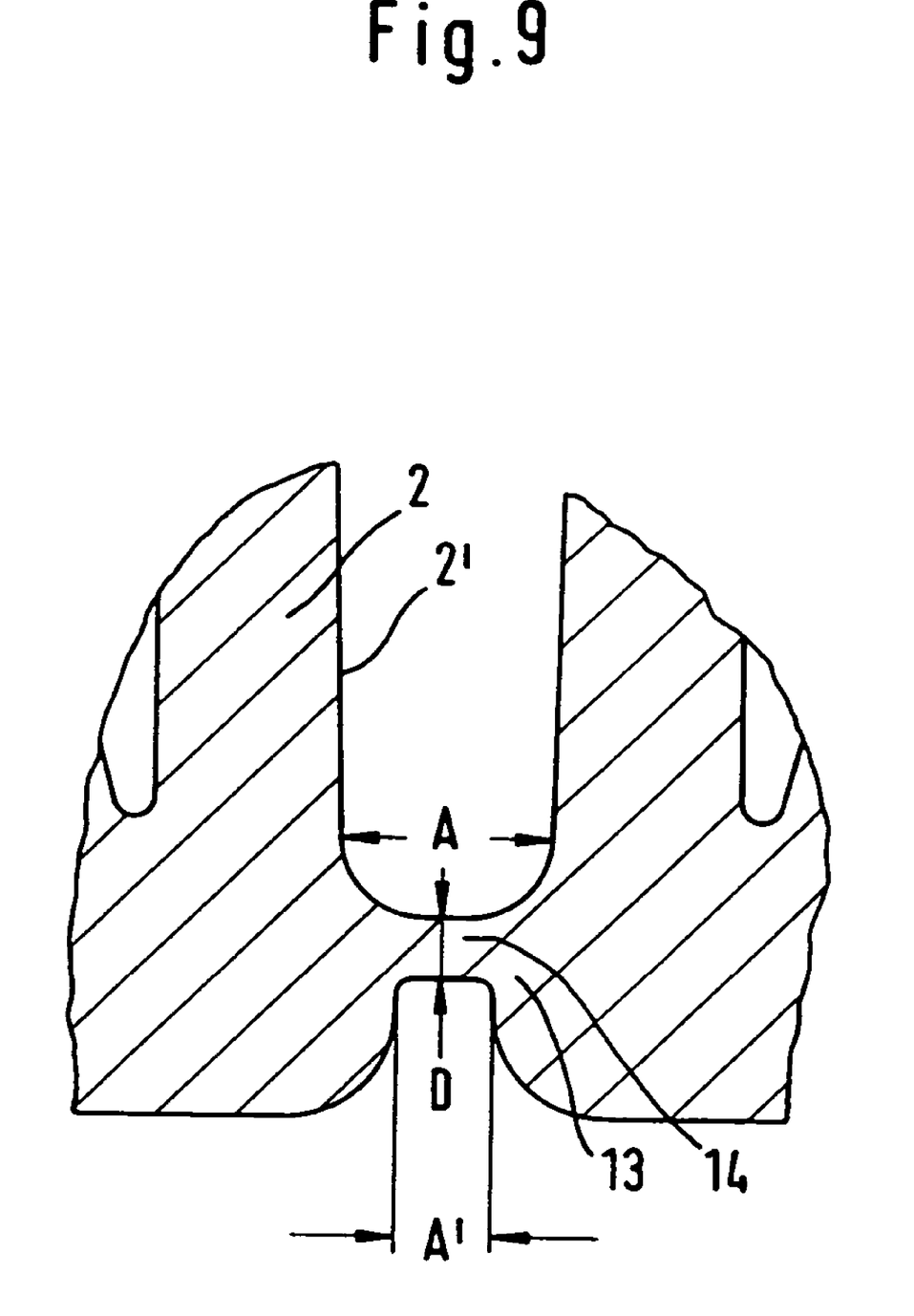
FIG. 9 shows a greatly enlarged longitudinal section through a web and the adjoining ratchet parts.

The distance A between the surfaces 2' of the wall sections 2 in their region close to the web 10 is expediently 0.8 to 1.3 mm, or else expediently up to 1.1 mm. It should not exceed one sixth, preferably one eighth, of the length of the ratchet. The root regions 13 of the webs 10 are designed such as to be thickened bead-like relative to the center region 14. This firstly improves the force transmission between the wall sections 2 and the webs 10 and also reduces the remaining length of the thin web stub after the cut, which stub may cause injury. The length of the thin web part between the beads 13 is expediently not greater than 0.6 mm. The length of the web stub remaining (including bead) is not to be greater than 0.7 mm and/or not greater than one tenth (preferably one twelfth) of the ratchet length. In the example shown, the webs 10 (including bead) have a length which corresponds to about one eighth of the length of the ratchets.

The thickness D of the web depends on the flexibility and strength required and is, for example, 0.2 to 0.4 mm or less than one tenth, preferably less than one fifteenth, of the ratchet height.

The width of the web is not greater than about half the width of the ratchets and is not greater than the width of the tie. The side edges 8 of the webs 10 are therefore set back from the ratchet edge line 15 by a distance 16 which should be in the order of magnitude of 2 mm and should be at least one eighth, preferably at least one fifth, of the ratchet width. However, the web width is at least about one fourth to one third of the ratchet width. The ratio of thickness to width of the webs is as a rule ⅕ to ⅒ and possibly more.

Figure 3:
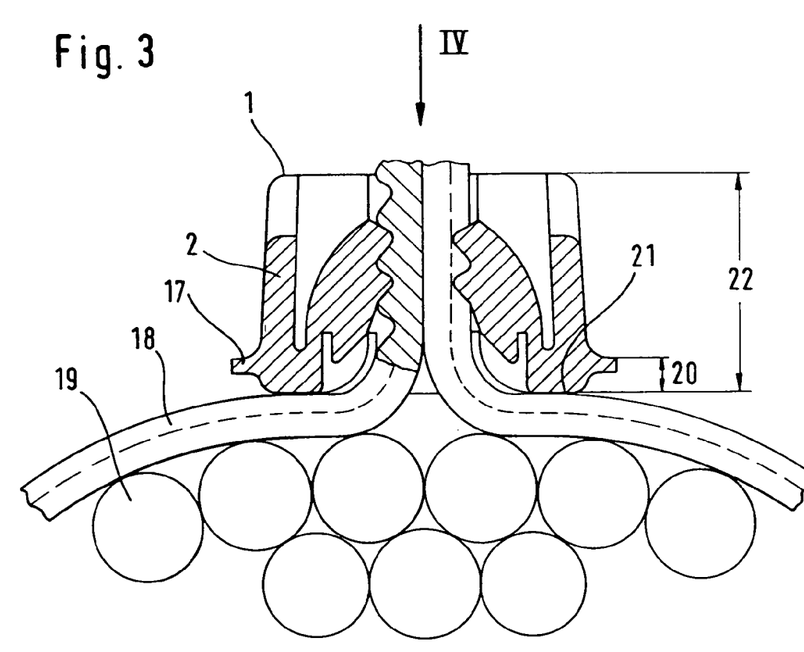
FIG. 3 shows the partly sectioned view of a ratchet in the bound state.
Figure 4:
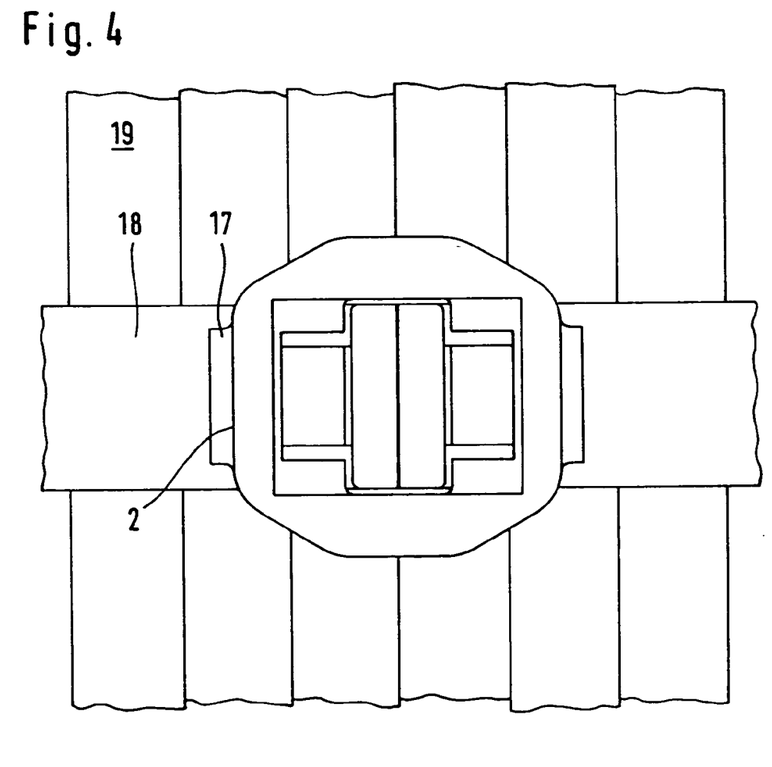
FIG. 4 shows a plan view of the arrangement according to FIG. 3 in arrow direction "IV"

During the handling of the ratchets, they are singularized by a cut approximately in the center of the web. Web stubs 17 are left behind, the position of which in relation to the ratchet, to the tie loop 18 and to the bound article 19 is illustrated in FIGS. 3 and 4. It can be seen in FIG. 3 that the web stub 17 lies at the depth of the spatial gusset which is formed by the adjacent wall section 2 of the ratchet and the tie loop 18 or the article 19. In view of the small length of the web stub and its protected position, it is extremely unlikely that a person will brush against this point inadvertently in such a way that this person could be injured.

The small distance between the ratchets in the magazine strip, this distance permitting the small length of the webs, requires a small wall thickness of the mold, used for the production, between those wall sections 2 of adjacent ratchets which are opposite one another. If this small wall thickness had to be provided over the entire width of the ratchets, this could be problematic. However, it is quite safe if, according to the invention, the width of the wall sections 2 and thus the width of the mold wall referred to are substantially smaller than the entire width of the ratchets. Between the obliquely running wall sections 3 of adjacent ratchets, the mold wall may be amply dimensioned and therefore offers good stability and heat dissipation.

The width region of the surfaces 2' of the wall sections 2 in which the latter run approximately parallel to one another should be not greater than three quarters and furthermore preferably two thirds of the entire width of the ratchets. It goes without saying that the ratchet walls need not be of strictly polygonal construction for forming the wall sections 2 and 3, although this is expedient. The approximately parallel course of the surfaces 2' of the wall sections 2 carrying the webs and the course of the outer wall sections 3 which is inclined thereto may also be reproduced by a continuous curve, as indicated by dot-dash line in FIG. 2 at the lowermost ratchet. Inclinations of less than 15°, possibly even greater inclinations, are to be regarded as essentially parallel.

The height 20 of all the edges of the web stub 17 above the adjacent edge 21 of the tie entry side, over which the tie 18 runs in the bound state, should be not greater than 2 mm (measured parallel to the wall section 2), preferably not greater than 1.2 mm. In the example shown, this dimension is about 1 mm. Expressed in fractions of the ratchet height 22, this dimension should not exceed one quarter, preferably one fifth.

The handling tool is explained below with reference to FIGS. 1 to 8. On its front end, the tool body 31 with a handle 32 has a holder 33 (not shown in any more detail) for a ratchet 34, and a tie 35 is passed through this holder 33 in the direction of the arrows, with means which are unimportant in the present connection, is wrapped in the form of a loop 37 around an article 36 to be bound and is returned with its free end into the ratchet 34. After that the tie is tensioned, the projecting strand 35 is cut off, and the ratchet 34 is released from the ratchet holder 33 (FIG. 7).

In order to permit largely automatic operation, the ratchets to be handled are automatically fed to the ratchet holder 33. From a stationary large magazine (not shown), they reach the tool body 31 in the form of a ratchet chain 41, in which the individual ratchets 1 are connected to one another by webs 10. At the tool body 31, the ratchet chain 41 is received by a guide channel 44, which opens out at the ratchet holder 33.

A device 50 for feeding and singularizing the ratchets is provided at the guide channel 44. The representation of the guide channel 44 is interrupted in the region of this device 50. However, it goes without saying that a guide for the ratchet chain 41 is also provided in this region. Parallel to this ratchet guide, a slide 51, which is illustrated by dots in the drawing, is mounted such as to be movable parallel to the ratchet guide in arrow direction 52. Two guide walls 53 schematically indicate the slide guide. Provided for driving the slide is a lever arm 54, which interacts with the slide 51 in a suitable manner at 55 and is pivotable about a pivot pin 56 fixed to the tool body 31. It is rigidly connected to a cam lever 57 which projects into the revolving path of two cams 58 which are arranged on a cam plate 59 which is rotationally driven counterclockwise about the axis 60 by an electric motor.

Rigidly connected to the lever arms 54, 57 is a third lever arm 61 whose end is linked to the push rod 62 of a compression spring 63. The spring 63 pushes the lever arm 61 upward (in the representation) and thereby pushes the end of the lever arm 54 in the direction of the front of the tool. On the other hand, if a cam 58 comes into engagement with the cam lever 57, as shown in FIG. 7, the cam lever 57 is pushed downward.

At the same time, the lever arm 61 is also moved downward, as a result of which the spring 63 is loaded. The lever arm 54 and with it the slide 51 are moved to the right (in the drawing), that is to say against the feed direction of the ratchet chain 41. If the cam 58 has passed the cam lever 57, the spring 63 attempts to pivot the lever arrangement 54, 57, 61 counterclockwise and thereby attempts to move the slide 51 in the feed direction.

A locking pawl 70 is linked to the slide 51. It is designed and arranged in such a way that its tip is pushed into engagement with the ratchet chain 41 by a spring (not shown). In more general terms, the pawl 70 has a surface which can come into engagement with a ratchet surface turned toward the rear in order to exert a feed force thereon.

Furthermore, a rocker 71, which is acted upon by a spring (not shown) in arrow direction 72, is linked to the slide 51. On its front end, it carries a blade 73, which is intended to sever a web 10 between successive ratchets 1 during a movement against the arrow direction 72. A cam lever 74, which seizes the rear end of the rocker 71 by means of a nose 75, is provided in order to effect this cutting movement of the rocker 71. Its bottom end projects into the revolving path of the rotary cams 58. If it is seized by a rotary cam according to FIG. 6, the pivot lever 74 is pivoted clockwise and the rocker 71 is pivoted against the arrow direction 72. The blade 73 performs the cut in the process. In the embodiment shown, the cam lever 44 is linked to the slide. Instead, it may also be attached to the tool body provided its interaction with the rocker is ensured.

The pawl 70 is designed in such a way that it always interacts with the ratchets 1 in the same way. The ratchet seized in each case by the pawl 70 is therefore located in a precisely defined position in relation to the pawl. Since the pawl 70 and the blade 73 are arranged at a fixed mutual distance apart on the slide 51, and since the ratchets always have the same form and are always at the same distance from one another, this ensures that the blade 73 always strikes the web 10 between two successive ratchets 1 exactly in the center. This would not be ensured if the cutting device were arranged in a fixed position on the tool body. For the respective position of the slide in relation to the tool body is undefined, as emerges from the subsequent description of the mode of operation.

Figure 5:
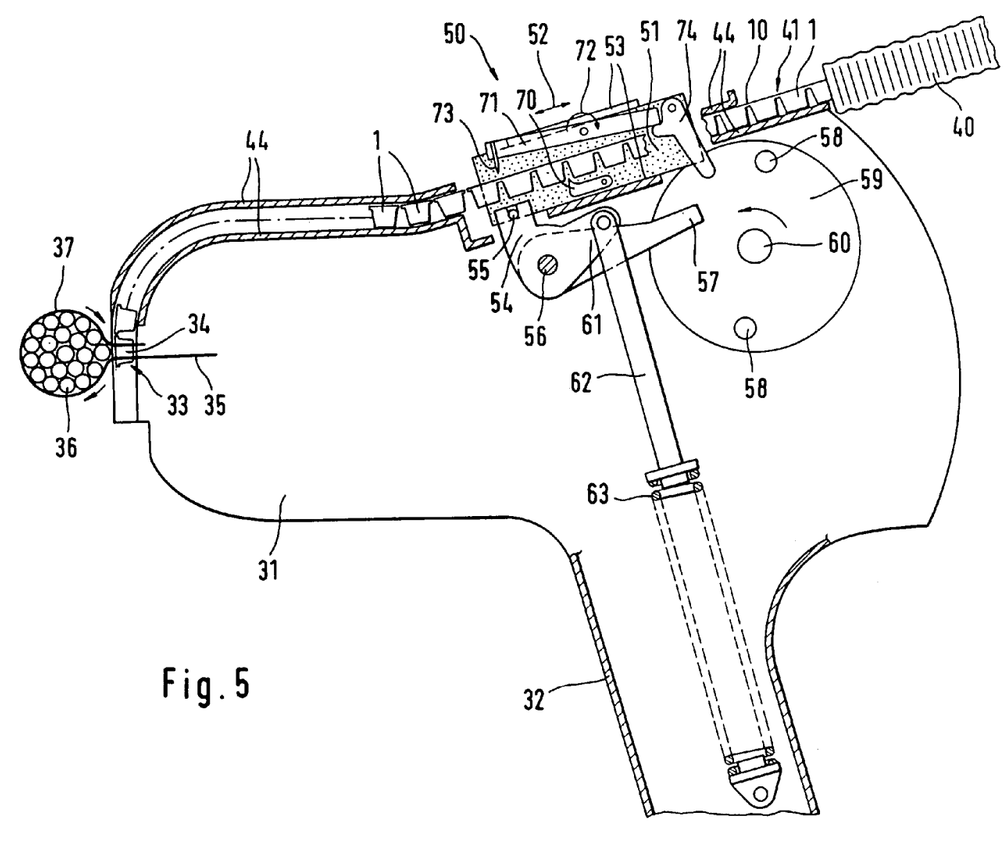
FIGS. 5 to 7 show three schematic sections through a tool in various functional states.
Figure 6:
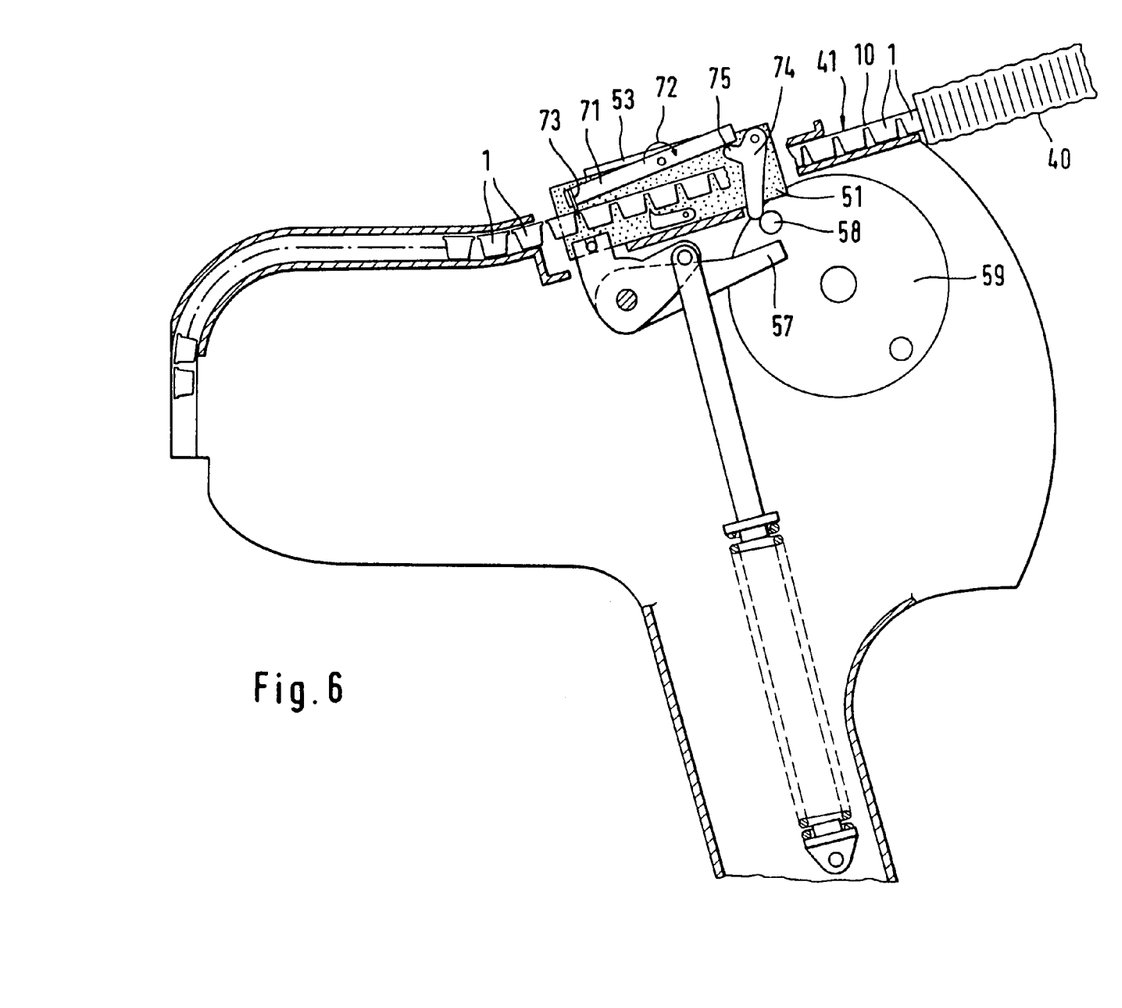
Figures 7, 8:
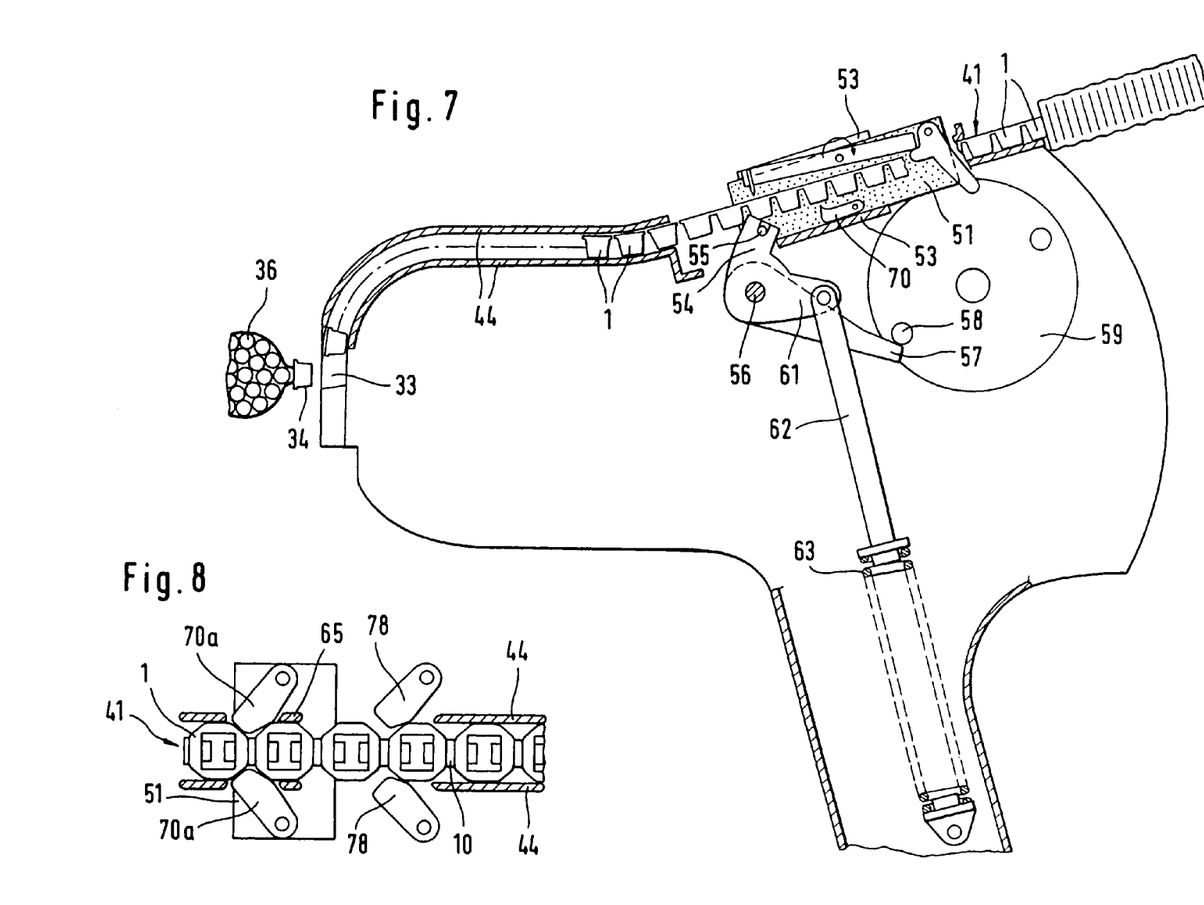
FIG. 8 shows a view of the locking pawl arrangement.

Since the representation in FIGS. 5 to 7 is highly schematic, the way in which the locking mechanism is expediently embodied in a practical manner is shown in FIG. 8. The slide 51 is arranged on both sides of the ratchet chain 41 and forms guides 65 for the latter. The cutting device is omitted from the representation. On each side of the ratchet chain 41, it carries a respective locking pawl 70a, which is pressed from the side by a spring (not shown) into the intermediate space, expediently of wedge-shaped design, between two ratchets 1. As a result, clearly defined positioning of the ratchets relative to the slide 51 is achieved. Arranged in a fixed position on the tool housing is a further pair of locking pawls 78 which are likewise pressed by spring force against the ratchets and ensure that the ratchet chain is held in place during the return of the slide 51 (to the right in FIG. 8).

The binding of the article 36 by means of the loop 37 takes place in the state in FIG. 5. In this state, the spring 63 exerts a feed force on the slide 51 via the lever arrangement 61, 54, and this feed force is transmitted to the ratchet chain 41 via the locking pawl 70. As a result, the foremost ratchet 34 is pressed reliably into the ratchet holder 33, the position of the slide 51 being determined by the length of the ratchets located between the foremost ratchet 34 and the locking pawl 70, on which ratchets the slide is supported under the spring force 63. Since this ratchet row located in front of the slide 51 consists of singularized ratchets, the distance apart of which does not necessarily correspond to their distance apart before the singularizing, the position of the slide 51 in this state is subjected to random fluctuations within a certain tolerance range. This is the reason why the cutting device 73 is arranged together with the pawl 70 on the slide 51.

During the working cycle of the tool, the cam plate 59 rotates continuously in the direction of the arrow. When the binding operation has been completed, a cam 58 reaches the bottom end of the cam lever 74 and pivots the latter according to FIG. 6, as a result of which the last ratchet located in the slide is cut off from the remaining ratchet row. When the cam 58 has left the cam lever 74, the latter together with the rocker 71 swings back again under the spring force 72 into the position according to FIGS. 5 and 7.

The cam 58 now reaches the end of the cam lever 57 and thereby pivots the cam arrangement clockwise. As a result, the spring 63 is loaded and the slide 51 is displaced to the rear (to the right in FIG. 7) by slightly more than a ratchet dimension. During this return stroke, the locking pawls 78 (FIG. 8) hold the ratchet row in place. In the process, the pawl 70 (or the pawls 70a) slide along a ratchet beyond its rear surface, which is to be seized during the next feed motion. As soon as the cam 58 has left the end of the cam lever 57, the slide 51 moves in the feed direction under the effect of the spring 63. In the process, first of all the pawl 70 (or the pawls 70a) engages in the nearest ratchet gap. As soon as the connected article 36 together with the foremost ratchet 34 has been removed from the tool and the ratchet holder is therefore empty, the slide 51 is moved further together with the ratchet chain until the ratchet which is now the foremost ratchet has reached the ratchet holder 33. The resistance which this ratchet finds in the ratchet holder is transmitted via the further ratchet chain up to the locking pawl 70 and the slide 51 and holds the latter in place. In the process, the force of the spring 63 or the feed force of the slide 51 constantly acts on the ratchet chain located in front of the slide.

Since the ratchet in front of the pawl 70 is still connected in one piece to the following chain of ratchets, the latter is also tightened accordingly.

The invention has the advantage that the separating cut between successive ratchets can be effected at a very accurately defined location and therefore the length of the web 10 which connects successive ratchets can be dimensioned to be very small. The stubs remaining on the ratchets are so short that they do not cause any risk of injury. They do not need to be removed. A cut free of scrap is therefore sufficient for this singularizing of the ratchets. An advantage of the invention also consists in the fact that the singularizing of the ratchets may take place at any desired considerable distance from the front of the tool, where it is difficult to accommodate a cutting device for the ratchets on account of the space available.

What is claimed is:

1. A magazine strip of tie ratchets which are provided for holding the ends of ties for binding elongated articles, each said tie ratchet having a ratchet width, a ratchet length measured parallel to said magazine strip and a tie entry side, wherein facing surfaces of adjacent ratchets are connected by webs adjacent the tie entry side, said webs having a web width and a web length measured parallel to the magazine strip, said web width being not greater than half said ratchet width and said web length being not more than 1.3 mm, said facing surfaces including center, substantially parallel surface sections having a width not greater than three quarters of said ratchet width, and diverging inclined surface sections to either side of said substantially parallel surface sections.

2. The magazine strip of claim 1, wherein said web length is not more than 1 mm.

3. The magazine strip of claim 1, wherein the width of the substantially parallel surface sections is not greater than two thirds of said ratchet width.

4. The magazine strip of claim 3, wherein a distance between the substantially parallel surface sections adjacent the tie entry side is not greater than 1.3 mm.

5. The magazine strip of claim 3, wherein said webs have root regions adjacent said substantially parallel surface sections and the root regions of the webs are thickened relative to a center region of the webs.

6. The magazine strip of claim 3, wherein said web width is equal to at least one quarter of said ratchet width.

7. The magazine strip of claim 1, wherein a distance between the substantially parallel surface sections adjacent the tie entry side is not greater than 1.3 mm.

8. The magazine strip of claim 1, wherein said webs have root regions adjacent said substantially parallel surface sections and the root regions of the webs are thickened relative to a center region of the webs.

9. The magazine strip of claim 1, wherein said web width is equal to at least one quarter of said ratchet width.

10. The magazine strip of claim 1, wherein a ratio of a smallest thickness of said web to said web width is not greater than $\frac{1}{5}$.

11. The magazine strip of claim 1, wherein adjacent ratchets and the web connecting them are designed in one piece.

12. The magazine strip of claim 1, wherein a web connecting two adjacent ratchets is integrally formed with one of the two ratchets and in a positive-locking manner to the other one of the two ratchets.

13. A magazine strip of tie ratchets which are provided for holding the ends of ties for binding elongated articles, each said tie ratchet having a ratchet width, a ratchet length measured parallel to said magazine strip and a tie entry side, wherein facing surfaces of adjacent ratchets are connected by webs adjacent the tie entry side, said webs having a web width and a web length measured parallel to the magazine strip, said web width being not greater than half said ratchet width and said web length being not more than one sixth of said ratchet length, said facing surfaces including center, substantially parallel surface sections having a width not greater than three quarters of said ratchet width, and diverging inclined surface sections to either side of said substantially parallel surface sections.

14. The magazine strip of claim 13, wherein the width of the substantially parallel surface sections is not greater than two thirds of said ratchet width.

15. The magazine strip of claim 13, wherein said webs have root regions adjacent said substantially parallel surface sections and the root regions of the webs are thickened relative to a center region of the webs.

16. The magazine strip of claim 13, wherein said web width is equal to at least one quarter of said ratchet width.

17. The magazine strip of ratchets of claim 13, wherein said web length is not more than one eighth of said ratchet length.

* * * * *